(12) United States Patent
Hyun

(10) Patent No.: US 7,350,730 B2
(45) Date of Patent: Apr. 1, 2008

(54) SIDE COVER DETACHABLE APPARATUS OF DUAL BEARING REEL FOR FISHING

(75) Inventor: Kwang Ho Hyun, Kyunggido (KR)

(73) Assignee: Doyo Engineering Co., Ltd. (KR)

( * ) Notice: Subject to any disclaimer, the term of this patent is extended or adjusted under 35 U.S.C. 154(b) by 0 days.

(21) Appl. No.: 11/735,424

(22) Filed: Apr. 13, 2007

(65) Prior Publication Data

US 2007/0246590 A1    Oct. 25, 2007

(30) Foreign Application Priority Data

Apr. 20, 2006  (KR)  ............ 20-2006-0010582

(51) Int. Cl.
*A01K 89/01*  (2006.01)

(52) U.S. Cl. ................. 242/314; 242/310

(58) Field of Classification Search .......... 242/310, 242/311, 312, 313, 314
See application file for complete search history.

(56) References Cited

U.S. PATENT DOCUMENTS

| 5,558,290 | A  | * | 9/1996  | Sato ................ 242/313 |
| 5,873,535 | A  | * | 2/1999  | Jeung ............... 242/314 |
| 6,460,793 | B1 | * | 10/2002 | Hirayama et al. .... 242/313 |
| 7,070,139 | B2 | * | 7/2006  | Nakagawa et al. ... 242/313 |

* cited by examiner

*Primary Examiner*—Emmanuel M Marcelo
(74) *Attorney, Agent, or Firm*—Tuchman & Park LLC

(57) ABSTRACT

Provided a side cover detachable apparatus of a dual bearing reel for fishing. The apparatus includes a boss, a rod, and a spring. The boss is provided within a side cover, has a stop hole at a center, and has a slope surface around a front end. The rod moves to the left/right with passing through a reel frame and the side cover, and is selectively inserted into the stop hole of the boss. The spring is fitted around the rod and elastically supports left/right movement of the rod.

5 Claims, 6 Drawing Sheets

SIDE COVER DETACHABLE APPARATUS OF DUAL BEARING REEL FOR FISHING

FIELD OF THE INVENTION

The present invention relates to a side cover detachable apparatus of a dual bearing reel for fishing, and more particularly, to a side cover detachable apparatus of a dual bearing reel for fishing, for enabling a stable separation and combination of a side cover together with a simple and convenient operation.

BACKGROUND OF THE INVENTION

As well known in the art, a dual bearing reel for fishing includes a reel frame; a spool rotatably installed within the reel frame; a handle installed at one side of the reel frame and rotating and activating the spool; and a side cover installed outside the reel frame.

The side cover refers to a means for covering the spool installed within the reel frame and other parts.

The side cover includes a side cover detachable apparatus. The side cover detachable apparatus separates and combines the side cover to the reel frame according to need. This is to separate the spool from the reel frame by separating the side cover from the reel frame at the time of check or change of parts, specifically, the spool in use.

However, the conventional side cover detachable apparatus has a drawback that because it is of a protrusive appearance from the side cover, a fishing line is entangled in the side cover detachable apparatus in use, thereby causing a hindrance to a fishing operation. As a solution to this drawback, attempt has been made to unevenly install the side cover detachable apparatus on the side cover. However, this causes troublesomeness in use because the side cover detachable apparatus is installed in a position where it is inconvenient for operation.

Also, a conventional locking apparatus has a drawback of incurring a higher cost because it is manufactured using not a work piece but a metal mold.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a side cover detachable apparatus of a dual bearing reel for fishing, for enabling a stable separation and combination of a side cover together with a simple and convenient operation.

Another aspect of exemplary embodiments of the present invention is to provide a side cover detachable apparatus of a dual bearing reel for fishing, for firmly combining a side cover to a reel frame by an elastic force of a spring.

A further another aspect of exemplary embodiments of the present invention is to provide a side cover detachable apparatus of a dual bearing reel for fishing, having an excellent durability together with a convenience of use.

According to one aspect of exemplary embodiments of the present invention, there is provided a side cover detachable apparatus of a dual bearing reel for fishing, for separating and combining a side cover to a side surface of the reel frame. The reel has a reel frame and a spool rotatably installed at the reel frame. The apparatus includes a boss, a rod, and a spring. The boss is provided within the side cover, has a stop hole at a center, and has a slope surface around a front end. The rod moves to the left/right with passing through the reel frame and the side cover, and is selectively inserted into the stop hole of the boss. The spring is fitted around the rod and elastically supports left/right movement of the rod.

As the side cover rotates, an end of the rod may be pushed to one side, getting in contact with the slope surface of the boss, and then may return by a tension force of the spring and may be fitted into the stop hole of the boss.

A front end of the rod may be exposed outside the reel frame.

A groove may be provided around the front end of the rod.

The rod may pass a space between the spool and the reel frame.

BRIEF DESCRIPTION OF THE DRAWINGS

The accompanying drawings, which are included to aid in The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings. In the following description, a detailed description of known functions and configurations incorporated herein has been omitted for conciseness.

Figure 1:
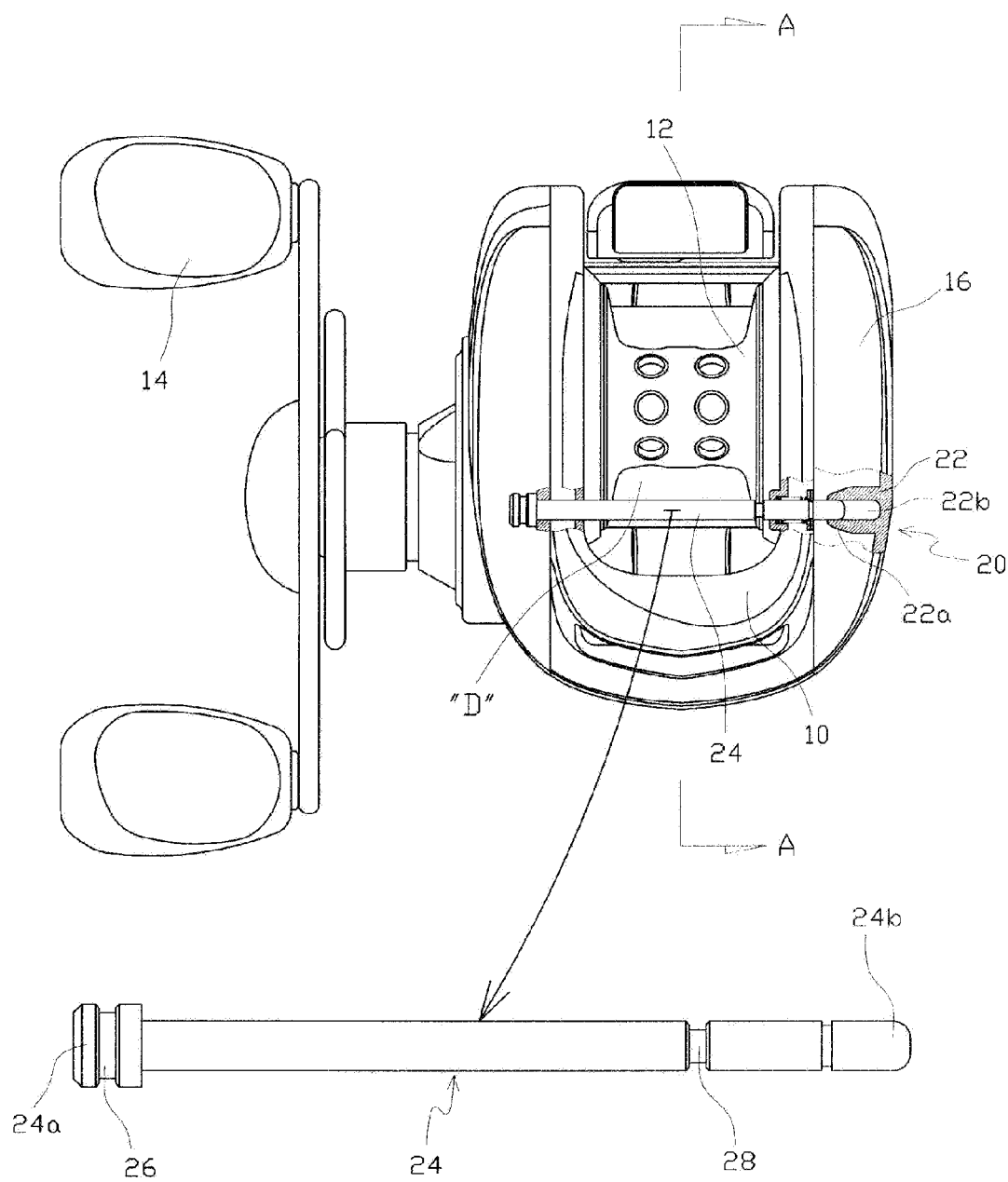
FIG. 1 is a front view illustrating whole construction of a dual bearing reel for fishing in which a side cover detachable apparatus is installed according to an exemplary embodiment of the present invention.

FIG. 1 is a front view illustrating whole construction of a dual bearing reel for fishing in which a side cover detachable apparatus is installed according to an exemplary embodiment of the present invention.

As shown in FIG. 1, the dual bearing reel for fishing includes a reel frame 10; a spool 12 rotatably installed within the reel frame 10 and winding a fishing line; a handle 14 installed at one side of the reel frame 10 and rotating and driving the spool 12; and a side cover 16 assembled to a side surface of the reel frame 10.

Figure 2:
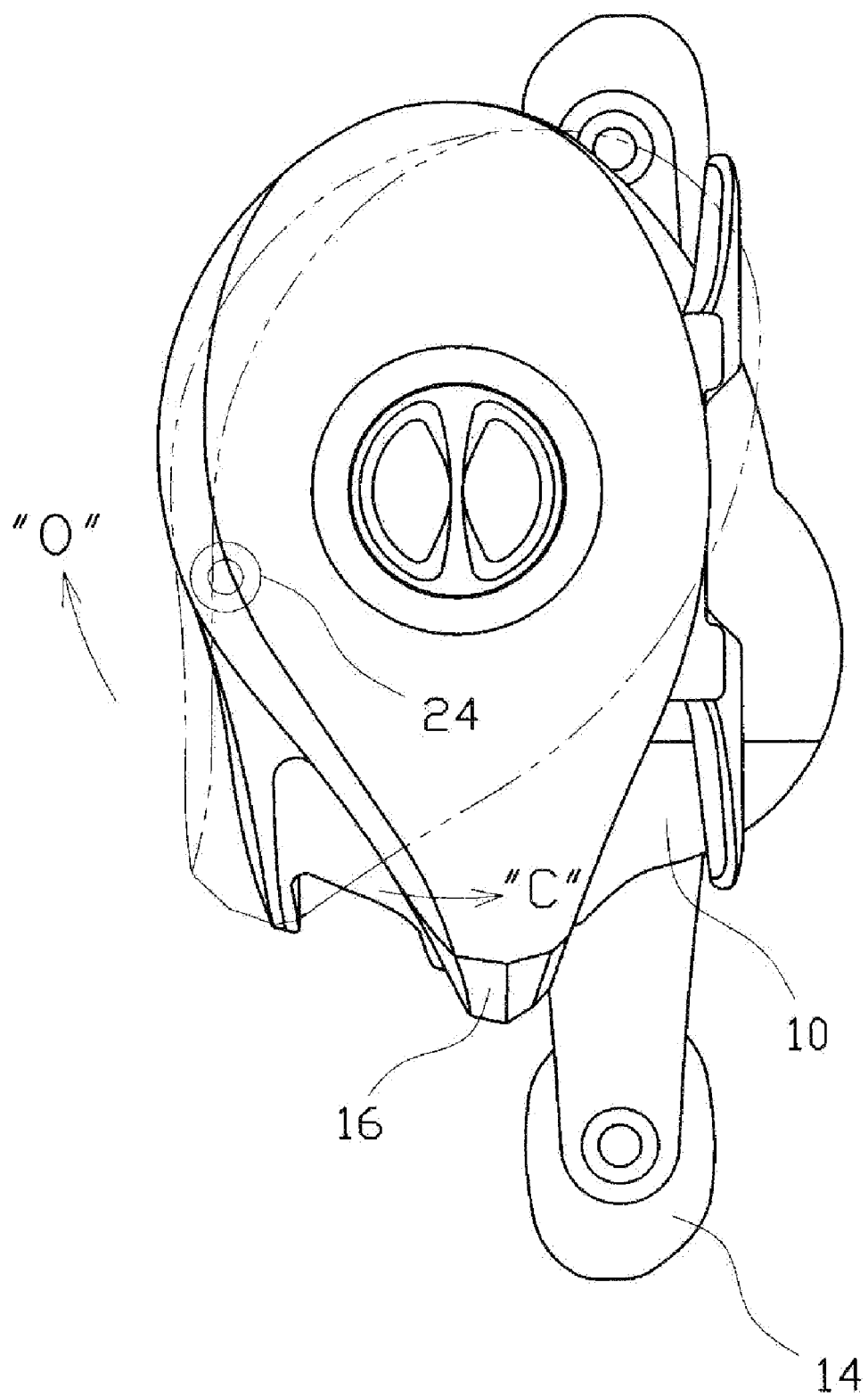
FIG. 2 is a side view of FIG. 1.

The side cover detachable apparatus 20 for combining and separating the side cover 16 on the reel frame 10 is installed between the side cover 16 and the reel frame 10. In detail, as shown in FIG. 2, the side cover 16 is forwardly and inversely rotated on the reel frame 10 in an opening direction (O) or a close direction (C) and is combined and separated depending on a locking operation and an unlocking operation of the side cover detachable apparatus 20.

Figure 3:
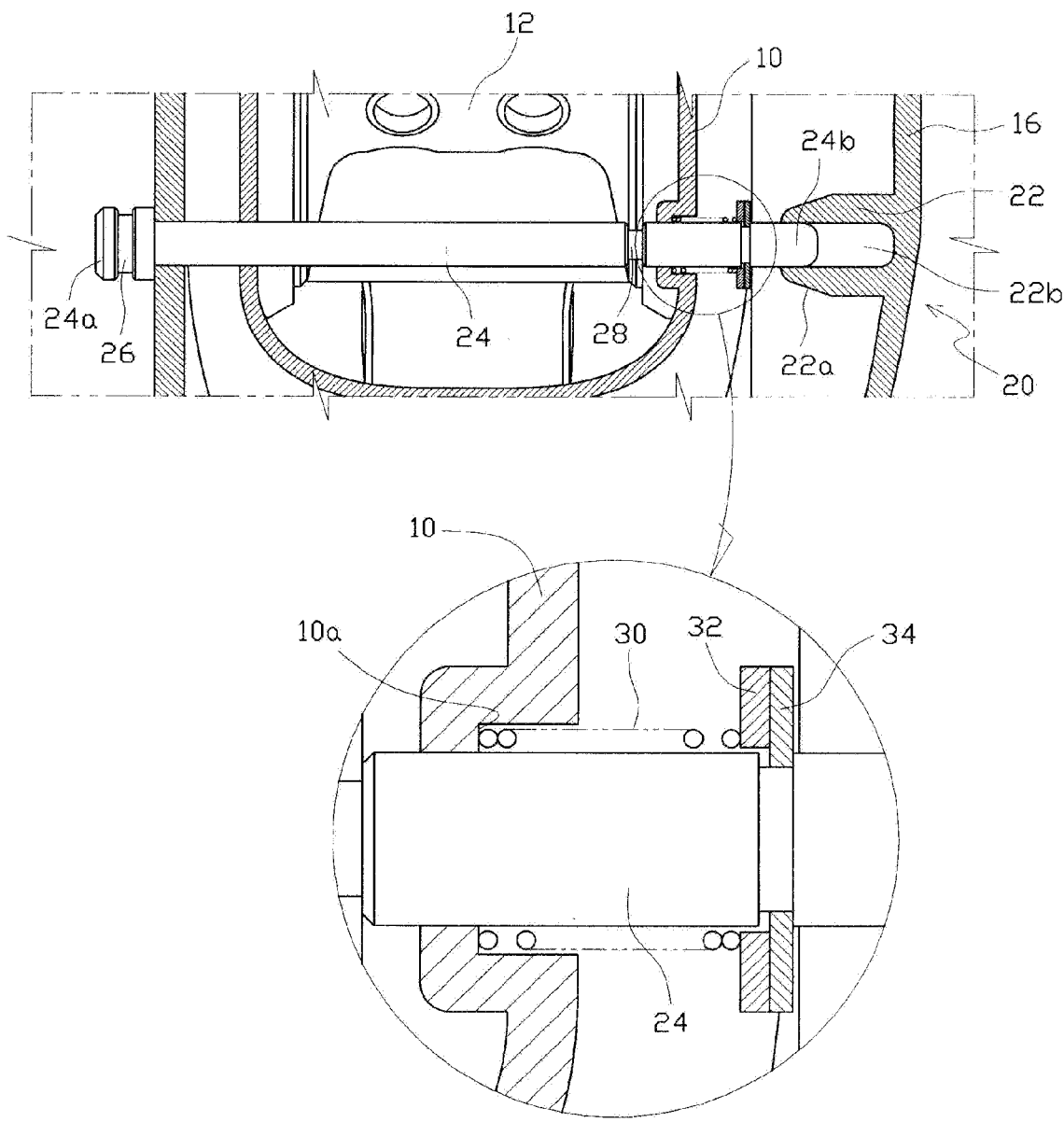
FIG. 3 is a detailed diagram illustrating part of the side cover detachable apparatus of FIG. 1.
Figure 4:
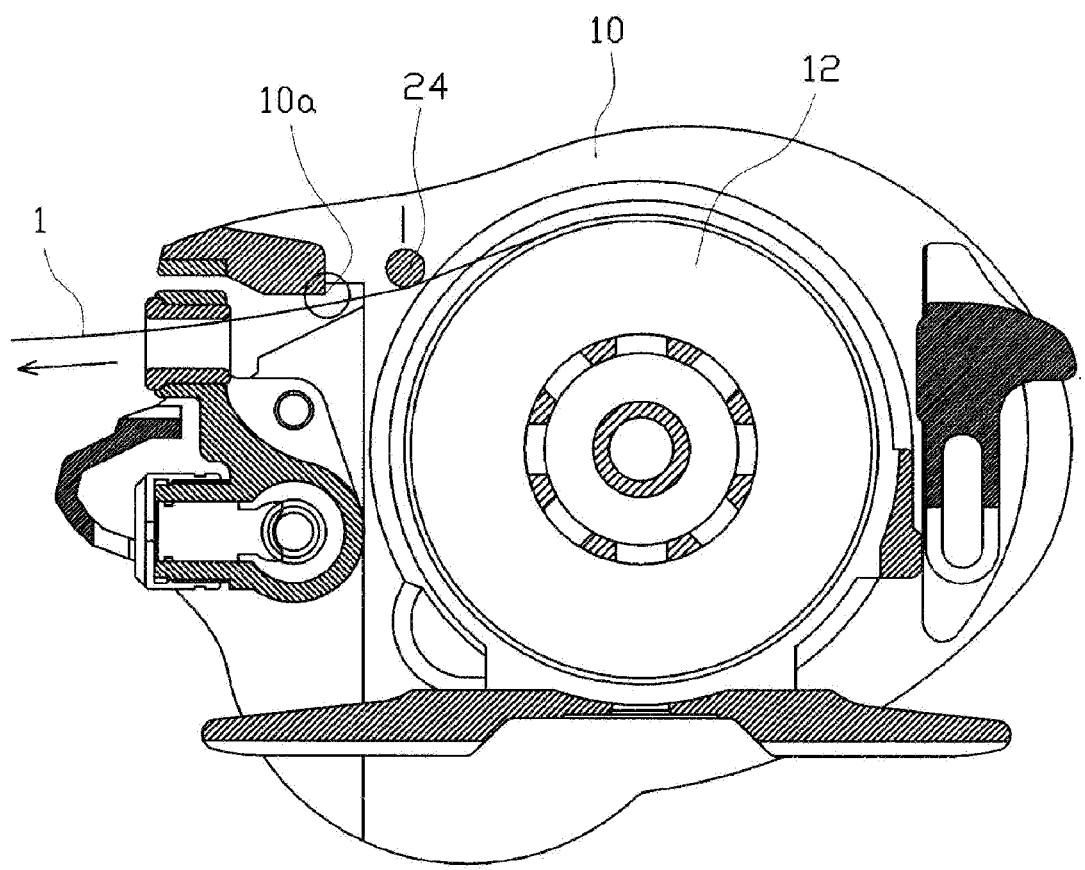
FIG. 4 is a diagram taken along line A-A of FIG. 1.

FIG. 3 illustrates a detail of construction of the side cover detachable apparatus 20.

As shown in FIG. 3, the side cover detachable apparatus 20 includes a boss 22, a rod 24, and a spring 30.

The boss 22 is integrally formed within the side cover 16.

The boss 22 has a stop hole 22b at a center. An end 24b of the rod 24 is selectively fitted into the stop hole 22b.

The boss 22 has a tapered slope surface 22a at a front circumference. The slope surface 22a gets in contact with the end 24b of the rod 24 and pushes the rod 24 in one-side direction (left side in FIG. 3) depending on rotation of the side cover 16.

The rod 24 moves to the left and right with passing through the reel frame 10 and the side cover 16.

It is desirable that a front end 24a of the rod 24 is exposed outside the reel frame 10. This is to enable fisherman to catch and pull the rod 24 in the left direction, thereby releasing the end 24b of the rod 24 from the stop hole 22b of the boss 22 and unlocking the side cover 16.

It is desirable to provide a groove 26 around the exposed front end 24a of the rod 24. This is to enable fisherman to directly catch the groove 26 with hands or fit a jig (not shown) and the like into the groove 26, thereby facilitating pulling of the rod 24. It is desirable to provide a groove 28 around the rod 24 passing a space (D) between the spool 12 and the reel frame 10, thereby enabling fisherman to catch the groove 28 with hands or fit a jig and the like into the groove 28.

The end 24b of the rod 24 is removably fitted into the stop hole 22b of the boss 22 and locks and unlocks the side cover 16.

A detailed description of operation of the side cover 16 will be made below.

In a lock mode of the side cover 16, the end 24b of the rod 24 is pushed to the left, getting in contact with the slope surface 22a of the boss 22, when fisherman rotates the side cover 16 in the close direction (C) of FIG. 2 with the end 24b of the rod 24 released from the stop hole 22b of the boss 22. After that, the end 24b again returns (moves to the right) by a tension force of the spring 30 and is fitted into the stop hole 22b of the spring 22. Thus, the side cover 16 can be combined to the reel frame 10 in a rotation hold state (that is, in a lock state).

In an unlock mode of the side cover 16, the end 24b of the rod 24 is released from the stop hole 22b when fisherman pulls the front end 24a of the rod 24 in the left direction with catching the front end 24a of the rod 24 with hands or with fitting the jigs into the grooves 26 and 28 provided around the front end 24b or the rod 24. Thus, the side cover 16 can be rotated in the opening direction (O) of FIG. 2 and separated from the reel frame 10 in a rotation free state.

As described above, the rod 24 has a function of, upon casting, preventing a fishing line 1 from getting in contact with a sharp corner 10a of the reel frame 10 and being damaged when being unwound from the spool 12, because it is designed to pass the space (D) between the spool 12 and the reel frame 10.

Figure 5:
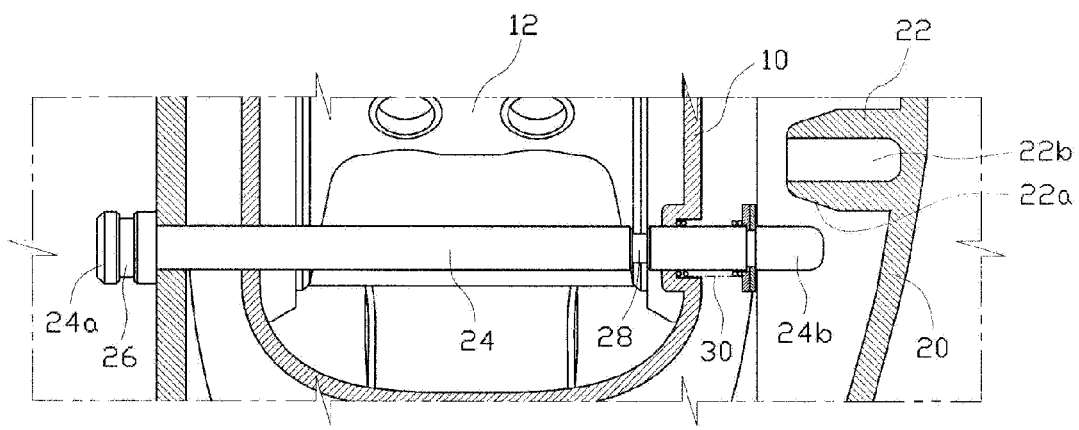
FIGS. 5 to 7 sequentially illustrates a process of locking a side cover detachable apparatus to fix a side cover to a reel frame.

In detail, if the rod 24 is designed to pass the space (D) provided between the spool 12 and the reel frame 10 as shown in FIG. 5, the wound fishing line 1 is unwound from the spool 12, passing the rod 24. At this time, the rod 24 prevents the fishing line 1 from getting in contact with the sharp corner 10a of the reel frame 10 and thus prevents the fishing line 1 from being damaged upon casting.

The spring 30 is caught at one end by a catch groove 10a of the reel frame 10 and is caught at the other end by a washer 32 and a retainer 34 fitted around the rod 24, when it is fitted around the rod 24. Thus, the spring 30 elastically supports left/right movement of the rod 24.

Operation of the side cover detachable apparatus of the dual bearing reel for fishing according to the present invention will be described below.

Figure 6:
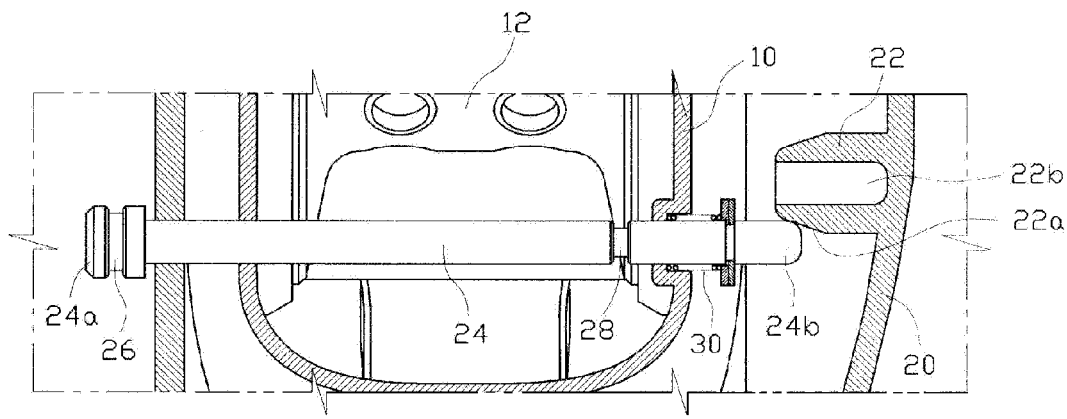
Figure 7:
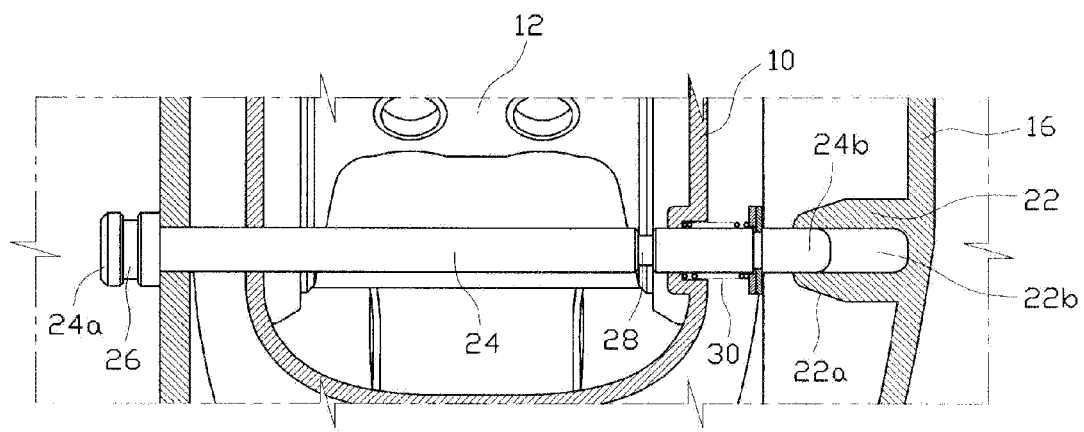

FIGS. 5 to 7 sequentially illustrates a procedure of locking the side cover detachable apparatus 20 and combining and fixing the side cover 16 to the reel frame 10.

When fisherman rotates the side cover 16 in the close direction (C) of FIG. 2, the slope surface 22a of the boss 22 and the end 24b of the rod 24 get in contact with each other as shown in FIG. 6 in a state where the boss 22 and the rod 24 constituting the side cover detachable apparatus 20 are spaced apart from each other as shown in FIG. 5. When fisherman keeps rotating the side cover 16, the end 24b of the rod 24 is pushed to the left in contact with the slope surface 22a.

When the end 24b of the rod 24 is positioned on the stop hole 22b of the boss 22, passing the slope surface 22a of the boss 22, the rod 24 moves to the right by the tension force of the spring 30 as shown in FIG. 7 and thus the end 24b of the rod 24 is fitted into the stop hole 22b of the boss 22. Accordingly, the side cover 16 is maintained as being combined and fixed to the reel frame 10 in a rotation hold state (a lock state).

Figure 8:
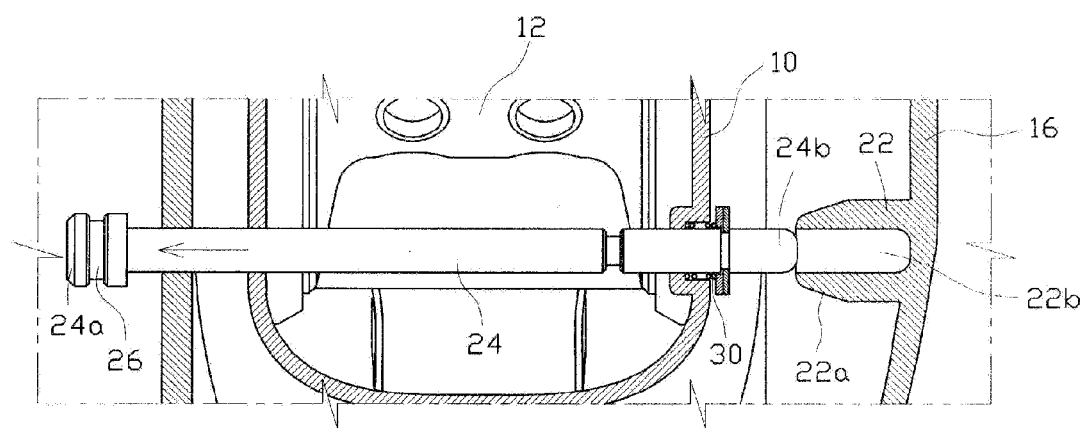
FIG. 8 illustrates a process of unlocking a side cover detachable apparatus to separate a side cover from a reel frame.

FIG. 8 illustrates a state where the side cover detachable apparatus 20 is unlocked to separate the side cover 16 from the reel frame 10.

In order to replace parts such as the spool 12 supported by the reel frame 10, the side cover 16 should be separated from the reel frame 10. For this, as shown in FIG. 8, fisherman pulls the rod 24 constituting the side cover detachable apparatus 20 in the left direction, thereby retiring the end 24b of the rod 24 from the stop hole 22b and releasing the side cover 16 from a rotation hold state. After that, fisherman rotates the side cover 16 in the opening direction (O) of FIG. 2, thereby separating the side cover 16 from the reel frame 10.

In order to release the rod 24 from the boss 22, fisherman can pull the rod 24 in the left direction with catching the front end 24a of the rod 24 exposed outside the reel frame 10. Alternately, fisherman can pull the rod 24 in the left direction with fitting the jig and the like into the groove 26 provided around the front end 24a of the rod 24 or into the groove 26 provided around the rod 24 passing the space (D) between the reel frame 10 and the spool 12.

As described above, the present invention can achieve many effects below.

First, the present invention has an effect of enabling a stable separation and combination of the side cover together with a simple and convenient operation, thereby promptly, simply, and conveniently replacing parts such as the spool.

Second, the present invention has an effect of enhancing a binding force of the side cover by the elastic force of the spring, thereby preventing the side cover from being unexpectedly separated from the reel frame due to external impact or other artificial force.

Third, the present invention has an effect of providing an excellent durability together with a convenience of use, thereby enhancing reliability of a product.

Fourth, the present invention has an effect of not exposing the side cover detachable apparatus outside, thereby preventing entanglement of the fishing line and promoting excellent aesthetic appearance.

Fifth, the present invention has an effect of preventing a damage of the fishing line by preventing the fishing line from getting in contact with the sharp corner of the reel frame upon casting.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A side cover detachable apparatus of a dual bearing reel for fishing, for separating and combining a side cover to a side surface of the reel frame, the reel having a reel frame and a spool rotatably installed at the reel frame, the apparatus comprising:

a boss provided within the side cover, having a stop hole at a center, and having a slope surface around a front end;

a rod moving to the left/right with passing through the reel frame and the side cover, and selectively inserted into the stop hole of the boss; and a spring fitted around the rod and elastically supporting left/right movement of the rod.

2. The apparatus of claim 1, wherein as the side cover rotates, an end of the rod is pushed to one side, getting in contact with the slope surface of the boss, and then returns by a tension force of the spring and is fitted into the stop hole of the boss.

3. The apparatus of claim 1, wherein a front end of the rod is exposed outside the reel frame.

4. The apparatus of claim 3, wherein a groove is provided around the front end of the rod.

5. The apparatus of claim 4, wherein the rod passes a space between the spool and the reel frame.

* * * * *